United States Patent [19]

Donnelly et al.

[11] Patent Number: 5,543,985
[45] Date of Patent: Aug. 6, 1996

[54] "ACTON" LOAD BEAM FOR A WINCHESTER DISK DRIVE

[75] Inventors: Craig E. Donnelly; David R. Grose, both of Westborough, Mass.

[73] Assignee: Quantum Corporation, Milpitas, Calif.

[21] Appl. No.: 510,432

[22] Filed: Aug. 2, 1995

Related U.S. Application Data

[63] Continuation of Ser. No. 259,217, Jun. 13, 1994, abandoned.

[51] Int. Cl.$^6$ .............................. G11B 5/48; G11B 21/16
[52] U.S. Cl. ............................................. 360/104
[58] Field of Search .................................. 360/104, 106

[56] References Cited

U.S. PATENT DOCUMENTS

| | | | |
|---|---|---|---|
| 4,884,154 | 11/1989 | Onodera et al. | 360/104 |
| 4,992,898 | 2/1991 | Wanlass | 360/104 |
| 5,003,420 | 3/1991 | Hinlein | 360/104 |
| 5,107,383 | 4/1992 | Takeuchi et al. | 360/104 |
| 5,187,625 | 2/1993 | Blaeser et al. | 360/104 |
| 5,198,945 | 2/1993 | Blaeser et al. | 360/104 |
| 5,291,359 | 3/1994 | Wolter | 360/104 |
| 5,339,208 | 8/1994 | Yumura et al. | 360/104 |

*Primary Examiner*—John H. Wolff
*Assistant Examiner*—George J. Letscher
*Attorney, Agent, or Firm*—David B. Harrison; Debra A. Chun

[57] ABSTRACT

A suspension load beam for a rigid disk drive. The load beam has a central load beam member having a flexure supporting surface and an opposing surface, and rails disposed along the sides of the central member. The rails form channels extending away from the flexure supporting surface at a proximal end of the central member, and the rails extend away from the opposing surface at a distal end of the central member. The rails thereby have the advantageous characteristics of "upswept" rails at the distal end of the load beam while retaining the advantageous characteristics of "reverse" rails at the proximal end of the load beam.

14 Claims, 5 Drawing Sheets

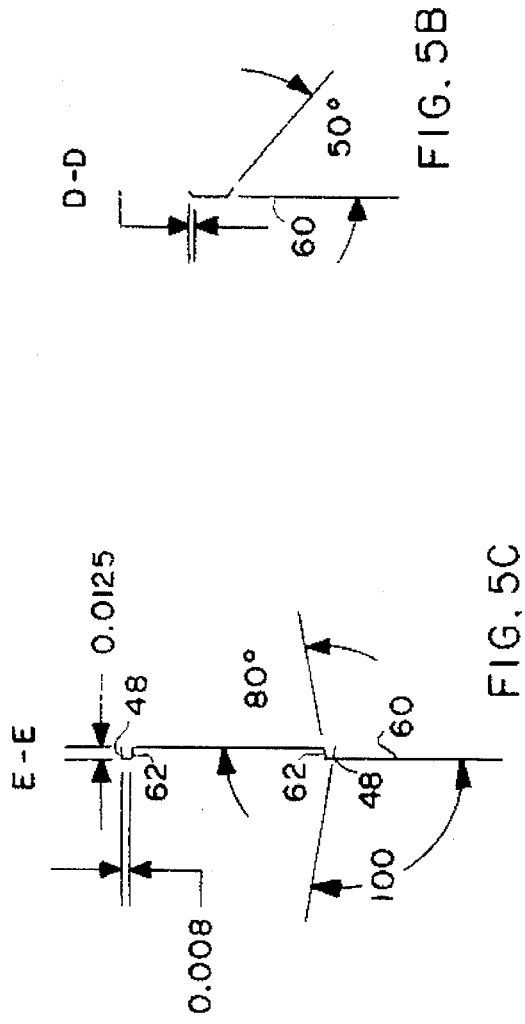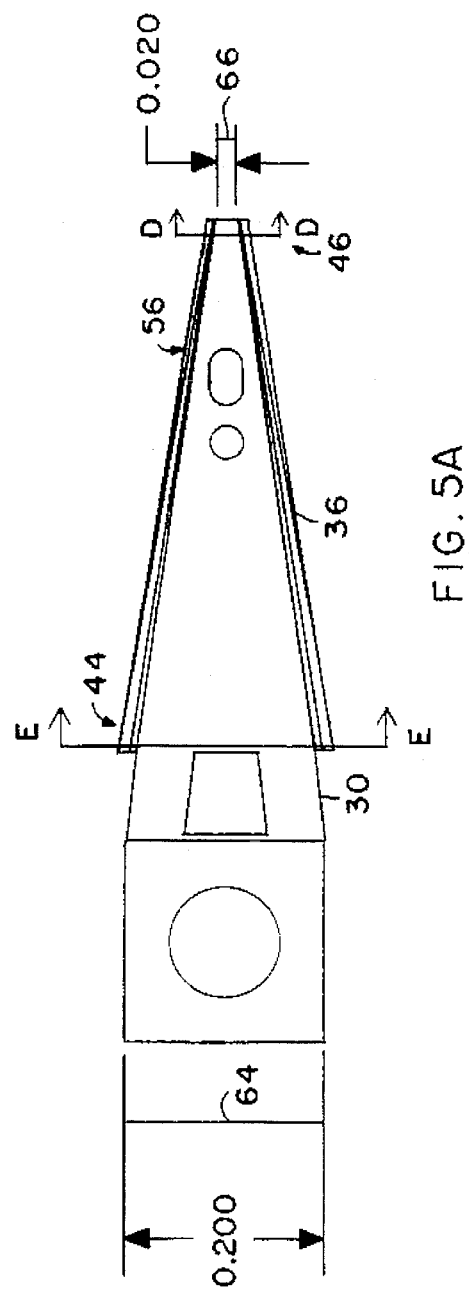

"ACTON" LOAD BEAM FOR A WINCHESTER DISK DRIVE

REFERENCE TO RELATED APPLICATION

This is a continuation of application Ser. No. 08/259,217 filed on Jun. 13, 1994, now abandoned.

BACKGROUND OF THE INVENTION

The present invention relates generally to disk drives, and more particularly to load beams in magnetic head suspension assemblies.

With the advent of more powerful computers and the rapid growth in the personal computer market it has become increasingly more important to enable a user to access data from storage devices with increased speed and accuracy. There is also an increasing demand for larger storage capacities in smaller package sizes.

In order to reduce access times to enable rapid retrieval of data, it is important to reduce undesirable levels of vibration of components within the rigid disk drive, and particularly within the head suspension assembly (HSA). The head suspension assembly (HSA) is a component within a disk drive which positions a magnetic read/write head over the storage media where information is to be retrieved or transferred. HSA's are mounted on rigid rotatable actuator arms and include load beams which support flexures on which the read/write heads are attached. Vibrations in the HSA can cause instability of the drive's servo system. It also may delay the transfer of data because the data can not be confidently transferred until the vibration has substantially decayed.

According to the dynamic characteristics of hard disk drive servo systems, higher vibration amplitudes or gains are more acceptable at higher frequencies—specifically, at frequencies well beyond the sampling frequency of the servo system. Increases in load beam lateral stiffness increase the frequency of vibrations beyond the servo frequency range.

Conventionally available magnetic head suspension assemblies have load beams with rails formed on the sides of the beam and extending either from the surface of the beam supporting the flexure and thus towards the disk, these rails being known as "reverse" rails, or extending from the opposite side of the beam and away from the disk, these rails being referred to as "upswept" rails.

The conventional "upswept" rail can be formed such that the rails converge at the tip of the beam on the surface opposite the flexure. This rail configuration provides advantageous lateral stiffness of the beam; however, in multiple disk drive applications, disk spacing must be maintained such that the rails (which are facing each other) on back-to-back head suspension assemblies do not interfere. This disk spacing requirement is deleterious to the goal of achieving higher data densities in smaller disk drive packages.

The conventional "reverse" rails cannot be formed to provide the same degree of convergence as the "upswept" rails because as the "reverse" rails converge toward the flexure tip, they will tend to interfere with the flexure. The "reverse" rails do not therefore provide the same advantageous degree of stiffness as the "upswept" rails. The "reverse" rail design does however allow closer inter-disk spacing due to the lack of interference between the rails of back-to-back suspensions. Increasing the height of the "reverse" rails provides added stiffness, but causes an interference problem between the beam and the disk surface; and is again counter to data density and smaller packaging goals.

One prior art load beam combines these two rail designs to provide a load beam having rails which are essentially of the "reverse" style at the flexure tip of the beam, but of the "upswept" style at the proximal end of the beam connected to the actuator arm. However, this configuration incorporates the problems of both the prior designs. The "reverse" rails at the tip of the beam cannot be provided with an advantageous degree of convergence due to interference with the flexure. Moreover, the "upswept" rails at the proximal end of the beam promote interference between back-to-back suspensions, thus preventing close disk spacing.

SUMMARY OF THE INVENTION

The present invention provides a suspension load beam for a rigid disk drive which retains the lateral stiffness advantages of the "upswept" rail load beam design while providing the inter-disk spacing advantage of the "reverse" rail load beam design.

In accordance with the present invention, there is provided a load beam having a generally flat central member having a flexure supporting surface facing the disk, and an opposing surface. A rail having lengthwise edges is disposed along a side of the central member and positioned with respect to the central member so that the height of a first portion of the rail extends away from the flexure supporting surface and toward the disk at a proximal end of the member, and the height of the rail extends away from the opposing surface and away from the disk surface at a distal end of the member. The lengthwise edges of the rail can be non-parallel with respect to the flexure supporting surface.

According to a more particular aspect of the invention, the rail is formed by bending a longitudinal edge of the member in the area of the distal end of the member to form a rail extending outward from the opposing surface of the member. The longitudinal edge of the central member in the proximal area of the member is bent to form the sidewall of a channel. The trough of the channel extends outward from the flexure supporting surface, the depth of the channel increasing from a point near the distal end of the member toward the proximal end of the member.

With this arrangement there is provided a load beam having rails with the characteristics of "upswept" rails at the distal end of the beam, allowing convergence of the ends of the rails without interference with the flexure. At the proximal end of the load beam, the rails have the characteristics of "reverse" rails, avoiding interference between back-to-back suspensions and thus allowing closer disk spacing.

BRIEF DESCRIPTION OF THE DRAWINGS

FIG. 5A is an overhead plan view of the load beam;

FIG. 5B is a cross-section of the load beam of FIG. 5A taken at section D—D; and FIG. 5C is a cross-section of the load beam of FIG. 5A taken at section E—E.

DETAILED DESCRIPTION OF THE PREFERRED EMBODIMENT

Figure 1:
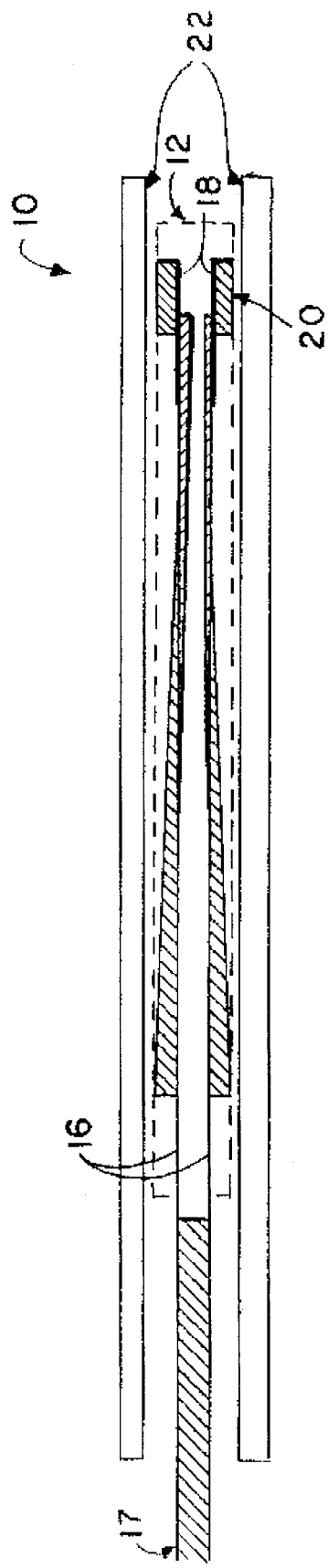
FIG. 1 is a cross-sectional view of a disk drive head suspension assembly including a load beam according to the principles of the invention.

In FIG. 1 there is shown a disk drive 10 including a head suspension assembly (HSA) 12. The HSA includes load beams 16 which are attached at their proximal ends to an actuator arm 17 by bonding or bolting or the like. Each load beam 16 carries on a disk facing surface a flexure 18, on which a slider 20 is attached. The disk drive read/write devices (not shown) reside on the slider 20. Each slider 20 is associated with a particular disk surface 22. During reading or writing, the actuator arm 17 rotates to position the sliders 20 over a particular track 24 on the respective disk surface 22. A servo system (not shown) controls the positioning of the sliders 20 over the selected tracks 24. The embodiment of FIG. 1 shows a single actuator arm to which two load beams 16 are attached. One skilled in the art will realize that a disk drive may include a stack of disks and a plurality of actuator arms situated between the disk surfaces, each actuator arm having attached to it a pair of load beams 16.

Figure 2:
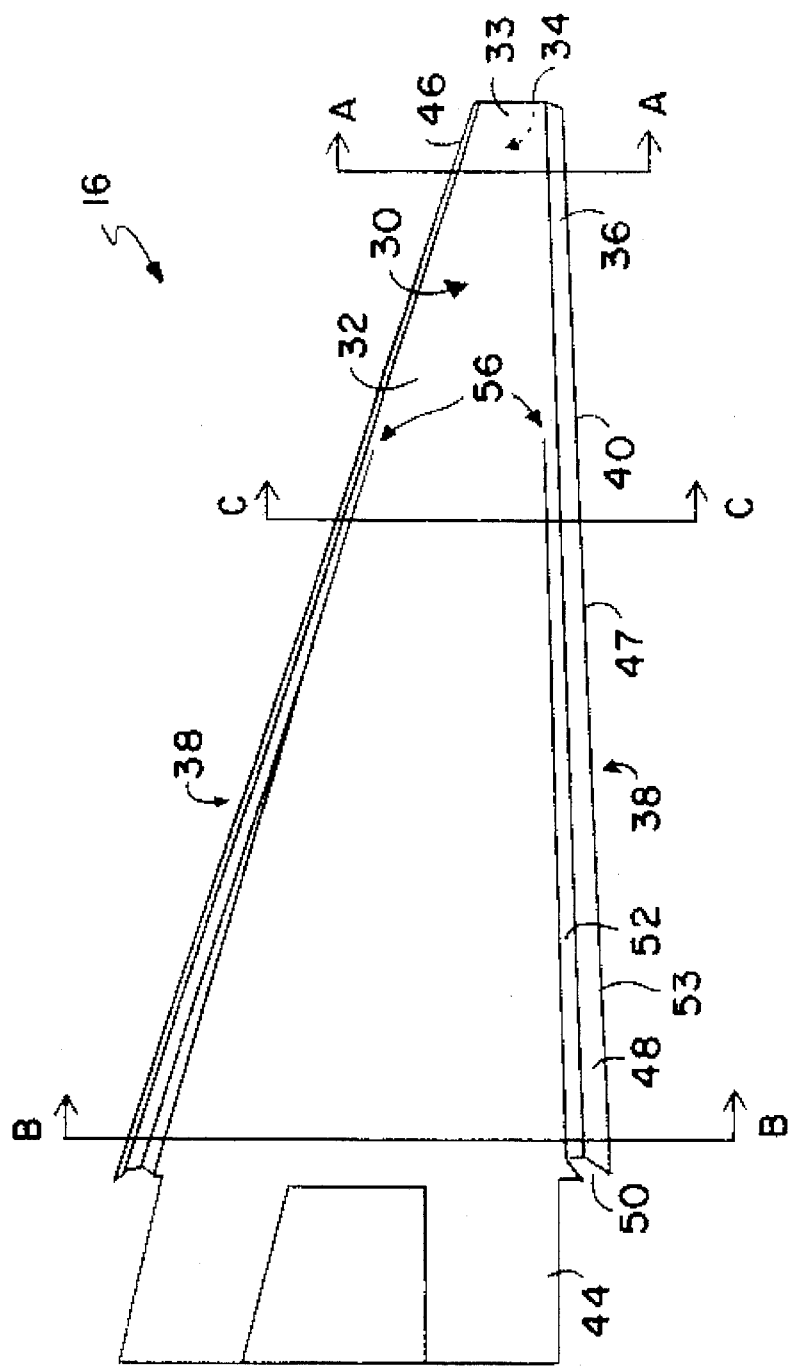
FIG. 2 is a perspective view of the load beam of FIG. 1.

In FIG. 2 there is shown a suspension load beam 16 of FIG. 1 according to the principles of the invention. The load beam includes a generally flat central member 30 having a flexure supporting surface 32 for supporting a flexure 18 and slider 20 at the distal end 33 thereof, and an opposing surface 34. Rails 36 are disposed along the lengthwise sides 38 of the flat central member 30. According to the particular embodiment shown, the lengthwise edges 40 of the rails 36 are non-parallel to the plane of the central member 30.

Figure 3:
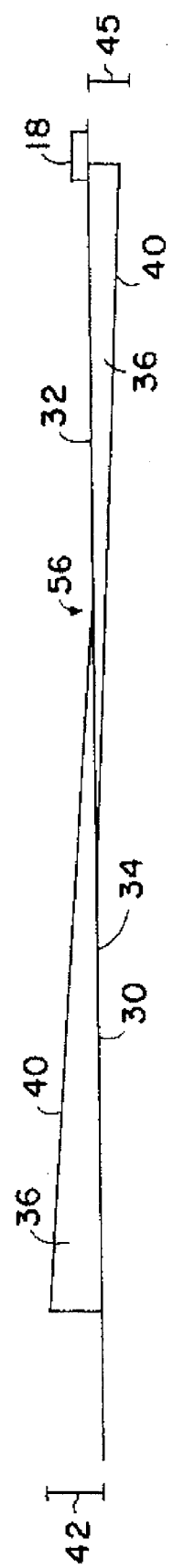
FIG. 3 is a lengthwise cross-sectional view of the load beam of FIG. 2.

Referring to FIG. 3, a lengthwise cross-sectional view of the load beam 16 shows the rails 36 being disposed so that the height 42 of a first portion of the rail 36 at the proximal end 44 of the central member 30 extends outward from the flexure supporting surface 32 in the manner of a "reverse" rail, while the height 45 of a second portion of the rail 36 at the distal end 46 of the central member 30 extends away from the opposing surface 34 in the manner of an "upswept" rail.

The "upswept" nature of the rails 36 at the distal end 46 of the load beam 16 imparts the necessary lateral stiffness to the load beam 16 while allowing the rails 36 to converge at the distal end 46 without interference with the flexure 18 (see FIG. 2). The "reverse" nature of the rails 36 toward the proximal end 44 of the load beam 16 imparts the necessary lateral stiffness to the load beam 16 while avoiding interference between back-to-back suspension assemblies (see FIG. 1.)

Figure 4A:
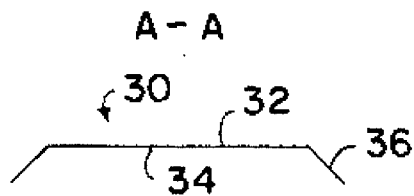
FIG. 4A is a cross-section of the load beam of FIG. 2 taken at section A—A.
Figure 4B:
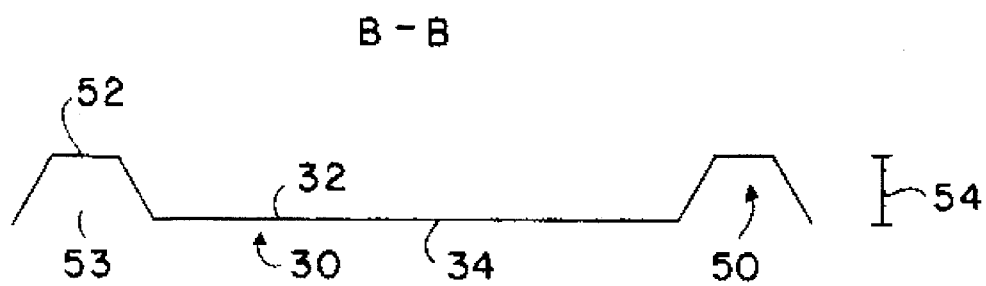
FIG. 4B is a cross-section of the load beam of FIG. 2 taken at section B—B.
Figure 4C:
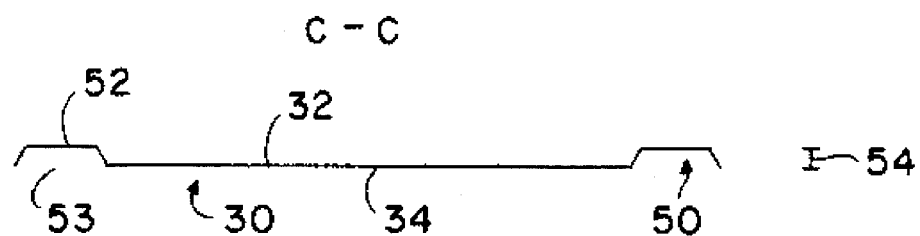
FIG. 4C is a cross-section of the load beam of FIG. 2 taken at section C—C.

Referring now to FIGS. 2, 3, and 4A, 4B, and 4C, the rails 36 according to the principles of the invention can be formed for example by bending lengthwise edges 47 of the central member 30 in the area of the distal end 46 to form rails 36 extending away from the opposing surface 34, as shown in the cross-section of FIG. 4A taken at section A—A of FIG. 3. The lengthwise edges 47 in the area of the proximal end 44 of the central member 30 are bent to form rails 36 which form the sidewalls 48 of channels 50. Referring to FIGS. 3 and 4B, the troughs 52 of the channels 50 extend outward from the flexure supporting surface 32 such that the depth 54 (i.e., the distance from trough 52 to the nominal top 53 of channel 50) of the channels increases from points 56 in the area of the distal end 46 of the central member 30, where the depth 54 is 0, toward the proximal end 44 of the central member 30 where the depth 54 is at a maximum. The increasing nature of the depth 54 of the channels 50 from the points 56 to the proximal end 44 of the central member 30 is shown by the cross-sections of FIGS. 4B and 4C. The cross-section of FIG. 4B is taken at section B—B of FIG. 2, toward the proximal end 44 of the central member 30, where the depth 54 of the channel is relatively large. The cross-section of FIG. 4C is taken at section C—C of FIG. 2, closer to the point 56, where the depth 54 of the channel is relatively small. The depth 54 of the channel 50 gradually reduces from the height 42 of the rail 36 at the proximal end 44 of the central member 30 to a height of zero at point 56 on the central member. The location of the point 56 intermediate the proximal end 44 and distal end 46 is a matter of design choice to be determined by the desired frequency response of the load beam 16.

Thus, the rails 36 extend away from the opposing surface 34 at the distal end 46 of the beam 16 in the manner of "upswept" rails, and then from the point 56 on the beam 16 the rails 36 become the sidewalls 48 of channels 50 increasing in depth 54 to the proximal end 44 of the load beam 16, thus forming "reverse" rails.

The dimensions of the various parts of the load beam 16 depend upon the application for which the load beam 16 is intended and the frequency response desired. For application in one particular 3½ inch disk drive, it has been found convenient to dispose the rails 36 at an angle to the central member 30. For instance, referring to FIG. 5A, the rails 36 in the "upswept" configuration at the distal end 46 of the beam 16 (section 'D—D') are advantageously placed at an angle of about 50 degrees from the plane 60 of the center member 30, as shown in FIG. 5B. Where the rails 36 define the channels 50, the troughs 52 of the channels 50 have a width of about 0.008 inches at the proximal end 44 of the load beam 16 (section 'E—E', FIG. 5C). The inner sidewalls 62 of the channels 50 are angled at about 80 degrees from the plane 60 of the center member 30, while the outer sidewalls 48 (formed by the rails 36) are angled at about 100 degrees from the plane 60 of the center member 30. The center member 30 has a width 64 of about 0.200 inches at its proximal end 44, and a width 66 of about 0.020 inches at its distal end 46. It has been found that the height of the reverse rails 36 at the proximal end of the load beam 16 can be reduced in comparison with conventional full reverse rail designs due to the improved performance provided by the upswept rails 36 at the distal end 46; thus, disk spacing can be further decreased.

The load beam 16 is easily manufactured using conventional manufacturing processes whereby load beams are etched and stamped from stainless steel.

It is apparent that, within the scope of the invention, modifications and different arrangements may be made other than as herein disclosed. For instance, though the lengthwise edges 40 of the rails 36 in the particular embodiment shown are non-parallel to the flexure supporting surface 32, other embodiments can provide rails 36 shaped in a different manner while still extending from the flexure supporting surface 32 at the proximal end 44 of the central member 30 and from the opposing surface 34 at the distal end of the central member 30. For instance, the rails 36 could extend such that their edges are parallel to the plane of the central member 30; also, the first and second portions of the rails 36 could be disposed in a spaced apart relationship rather than extending continuously through the point 56. The present disclosure is merely illustrative, the invention comprehending all variations thereof.

What is claimed is:

1. A suspension load beam for supporting a head adjacent to a disk surface in a rigid disk drive, said load beam comprising:

a generally flat central load beam member having a proximal end for attachment to an actuator arm, the central member having a flexure supporting surface on a first side thereof confronting the disk surface and having an opposing surface on an opposite side thereof, the central load beam member passing coplanarly through a reference plane;

a rail disposed along a side of the central load beam member, a first portion of the rail protruding from the flexure supporting surface toward the disk surface at the proximal end of the central member such that the first portion is positioned between the reference plane and the disk surface and a second portion of the rail protruding from the opposing surface and away from the disk surface at a distal end of the central member such that the second portion is positioned on a side of the reference plane facing away from the disk surface.

2. A suspension load beam for supporting a head adjacent to a disk surface in a rigid disk drive, said load beam comprising:

a generally flat central load beam member having a proximal end for attachment to an actuator arm, the central member having a flexure supporting surface on a first side thereof confronting the disk surface and having an opposing surface on an opposite side thereto the central load beam member passing coplanarly through a reference plane; and a rail disposed along a side of the central member, a first portion of the rail protruding from the flexure supporting surface toward the disk surface at the proximal end of the central member and terminating at a lengthwise edge and a second portion of the rail protruding from the opposing surface and away from the disk surface at a distal end of the central member and terminating at a lengthwise edge, the first portion being positioned between the reference plane and the disk surface and the second portion being positioned on a side of the reference plane facing away from the disk surface.

3. The suspension load beam of claim 2 wherein the lengthwise edges of the rail are non-parallel to the flexure supporting surface.

4. The suspension load beam of claim 2 wherein the first and second portions of the rail extend continuously along the side of the central member.

5. A suspension load beam for supporting a head adjacent to a disk surface in a rigid disk drive, said load beam comprising:

a generally flat central load beam member having a proximal end for attachment to an actuator arm, the central member having a flexure supporting surface on a first side thereof confronting the disk surface and having an opposing surface on an opposite side thereof, the central load beam member passing coplanarly through a reference plane; and a rail having lengthwise edges, the rail disposed along a side of the central member so that the lengthwise edges of the rail are non-parallel with respect to the flexure supporting surface, the rail protruding from the flexure supporting surface toward the disk surface and extending between the disk surface and the reference plane at the proximal end of the central member and the rail protruding from the opposing surface and away from the disk surface and being positioned on a side of the reference plane facing away from the disk surface at a distal end of the central member.

6. The suspension load beam of claim 5 wherein the rail is formed by bending a longitudinal edge of the central member in the area of the distal end of the central member to form a rail extending outward from the opposing surface, and bending the longitudinal edge of the central member in the area of the proximal end of the central member to form a rail which forms the sidewall of a channel, a trough of the channel extending outward from the flexure supporting surface and defining a depth of the channel relative to the flexure supporting surface, the depth of the channel increasing from the distal end of the central member toward the proximal end of the central member.

7. The suspension load beam of claim 6 wherein the depth of the channel is approximately equal to a height of the rail forming the sidewall of the channel.

8. The suspension load beam of claim 6 wherein the rail extending outward from the opposing surface is disposed at an angle to the plane of the central member, and wherein the portion of the rail which forms the sidewall of the channel is disposed at another angle to the plane of the central member.

9. The suspension load beam of claim 8 wherein the width of the central member at the proximal end is approximately 0.200 inches, and wherein the width of the central member at the distal end is approximately 0.020 inches, and wherein the rail extending outward from the opposing surface is disposed at an angle to the plane of the central member of approximately 50 degrees, and wherein the width of the trough of the channel is approximately 0.008 inches, and wherein the depth of the channel at the proximal end of the central member and the height of the rail at the proximal end of the central member is approximately 0.0125 inches, and wherein the portion of the rail which forms the sidewall of the channel is disposed at an angle to the plane of the central member of approximately 100 degrees, and wherein the other sidewall of the channel is disposed at an angle to the plane of the central member of approximately 80 degrees.

10. A suspension load beam for supporting a head adjacent to a disk surface in a rigid disk drive, said load beam comprising:

a generally flat central load beam member having a proximal end for attachment to an actuator arm, the central member having a flexure supporting surface on a first side thereof confronting the disk surface and having an exterior opposing surface on an opposite side thereof, the central load beam member passing coplanarly through a reference plane; and a rail formed by bending a longitudinal edge of the central member in an area of a distal end of the central member to form a rail protruding from the opposing surface and away from the disk surface and being positioned on a side of the reference plane facing away from the disk surface, and bending the longitudinal edge of the central member in an area of the proximal end of the central member to form a rail which forms the sidewall of a channel, a trough of the channel defining a depth and protruding from the flexure supporting surface towards the disk surface such that the trough is positioned between the reference plane and the disk surface at the proximal end, the depth of the channel increasing from the distal end of the central member toward the proximal end of the central member, the rail including a flange extending continuously from the distal end to the proximal end of the central member, the flange being connected to the trough and forming a second sidewall of the channel.

11. A magnetic head suspension for attachment to a rigid actuator arm in a disk drive to support a head adjacent to a disk surface, said head suspension comprising:

(a) a spring load beam element having a proximal end for attachment to the actuator arm, said load beam element comprising:

a generally flat central load beam member having a proximal end for attachment to the actuator arm, the central member having a flexure supporting surface on a first side thereof confronting the disk surface and having an opposing surface on an opposite side thereof the central load beam member passing coplanarly through a reference plane, and a rail disposed along a side of the central member, a first portion of the rail protruding from the flexure supporting surface toward the disk surface at the proximal end of the central member and a second portion of the rail protruding from the opposing surface and away from the disk surface at the distal end of the central member, the first portion being positioned between the reference plane and the disk surface and the second portion being positioned on a side of the reference plane facing away from the disk surface; and (b) a flexure attached to and projecting beyond the distal end of the load beam element for pivotably interconnecting the head to the load beam.

12. The magnetic head suspension of claim 11 wherein the rail of the spring load beam element is formed by bending a longitudinal edge of the central member of the spring load beam element in the area of the distal end of the central member to form a rail extending outward from the opposing surface, and bending the longitudinal edge of the central member in the area of the proximal end of the central member to form a rail which forms the sidewall of a channel, the trough of the channel extending outward from the flexure supporting surface, the depth of the channel increasing from the distal end of the central member toward the proximal end of the central member.

13. A magnetic head suspension for attachment to a rigid arm in a disk drive to support a head adjacent to a disk surface, said head suspension comprising:

(a) a spring load beam element adapted for joining to the rigid arm at a proximal end thereof, said load beam element comprising:

a generally flat central load beam member having a flexure supporting surface on a first side thereof confronting the disk surface and having an opposing surface on an opposite side thereof, the central load beam member passing coplanarly through a reference plane, and a rail having lengthwise edges, the rail formed by bending a longitudinal edge of the central member in an area of the distal end of the central member to form a rail protruding from the opposing surface and away from the disk surface and being positioned on a side of the reference plane facing away from the disk surface, and bending the longitudinal edge of the central member in an area of the proximal end of the central member to form a rail which protrudes from the flexure supporting surface toward the disk surface and which forms the sidewall of a channel, a trough of the channel extending from the flexure supporting surface toward the disk surface such that the trough is positioned between the reference plane and the disk surface at the proximal end, the trough defining a depth of the channel relative to said flexure supporting surface, the depth of the channel increasing from the distal end of the central member toward the proximal end of the central member; and (b) a flexure attached to and projecting beyond the distal end of the load beam element for pivotably interconnecting the head to the load beam.

14. A suspension load beam for supporting a head adjacent to a disk surface in a rigid disk drive, said load beam comprising:

a generally flat central load beam member having a proximal end for attachment to an actuator arm and a distal end for attachment to the head, the central member having a first surface disposed, in operative condition, facing the disk surface and having an opposing surface on an opposite side thereof, the central load beam member passing coplanarly though a reference plane; and a rail disposed along a side of the central member, a first portion of the rail extending outward from the first surface toward the disk surface at the proximal end of the central member and a second portion of the rail extending outward from the opposing surface away from the disk surface at the distal end of the central member, the first portion being positioned between the reference plane and the disk surface and the second portion being positioned on a side of the reference plane facing away from the disk surface.

* * * * *